US008473931B2

(12) United States Patent
Wu

(10) Patent No.: US 8,473,931 B2
(45) Date of Patent: *Jun. 25, 2013

(54) METHOD, SYSTEM AND PROGRAM PRODUCT FOR OPTIMIZING EMULATION OF A SUSPECTED MALWARE

(75) Inventor: Ji Yan Wu, Athens, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/424,958

(22) Filed: Mar. 20, 2012

(65) Prior Publication Data

US 2012/0180132 A1 Jul. 12, 2012

Related U.S. Application Data

(63) Continuation of application No. 11/855,392, filed on Sep. 14, 2007, now Pat. No. 8,176,477.

(51) Int. Cl.
*G06F 9/45* (2006.01)
*G06F 11/00* (2006.01)
*G06F 12/14* (2006.01)

(52) U.S. Cl.
USPC ............... 717/138; 717/160; 726/22; 726/24

(58) Field of Classification Search
None
See application file for complete search history.

(56) References Cited

U.S. PATENT DOCUMENTS

| 5,826,013 | A | 10/1998 | Nachenberg |
| 5,964,889 | A | 10/1999 | Nachenberg |
| 6,067,410 | A | 5/2000 | Nachenberg |
| 6,907,396 | B1 | 6/2005 | Muttik et al. |
| 6,971,019 | B1 | 11/2005 | Nachenberg |
| 7,069,583 | B2 | 6/2006 | Yann et al. |
| 7,146,305 | B2 | 12/2006 | van der Made |
| 7,290,282 | B1 | 10/2007 | Renert et al. |
| 7,316,009 | B2 * | 1/2008 | Peck .............................. 717/138 |
| 7,373,642 | B2 * | 5/2008 | Williams et al. .............. 717/160 |
| 7,506,321 | B1 * | 3/2009 | Irving et al. .................. 717/138 |
| 7,890,943 | B2 * | 2/2011 | Guo et al. ...................... 717/160 |
| 8,151,352 | B1 * | 4/2012 | Novitchi .......................... 726/24 |
| 8,234,709 | B2 * | 7/2012 | Viljoen et al. ................... 726/24 |
| 8,261,344 | B2 * | 9/2012 | Godwood et al. ............... 726/22 |

(Continued)

OTHER PUBLICATIONS

Kang et al., Emulating emulation-resistant malware, Nov. 2009, 12 pages, <http://delivery.acm.org/10.1145/1660000/1655151/p11-kang.pdf>.*

(Continued)

*Primary Examiner* — Thuy Dao
(74) *Attorney, Agent, or Firm* — Arthur J. Samodovitz

(57) ABSTRACT

A method, system and program product for optimizing emulation of a suspected malware. The method includes identifying, using an emulation optimizer tool, whether an instruction in a suspected malware being emulated by an emulation engine in a virtual environment signifies a long loop and, if so, generating a first hash for the loop. Further, the method includes ascertaining whether the first hash generated matches any long loop entries in a storage and, if so calculating a second hash for the long loop. Furthermore, the method includes inspecting any long loop entries ascertained to find an entry having a respective second hash matching the second hash calculated. If an entry matching the second hash calculated is found, the method further includes updating one or more states of the emulation engine, such that, execution of the long loop of the suspected malware is skipped, which optimizes emulation of the suspected malware.

6 Claims, 5 Drawing Sheets

U.S. PATENT DOCUMENTS

| | | | | |
|---|---|---|---|---|
| 8,266,692 | B2* | 9/2012 | Wenzinger et al. | 726/22 |
| 2004/0054993 | A1* | 3/2004 | Nair et al. | 717/138 |
| 2004/0255165 | A1 | 12/2004 | Szor | |
| 2009/0077544 | A1 | 3/2009 | Wu | |
| 2009/0300761 | A1* | 12/2009 | Park et al. | 726/23 |
| 2011/0219451 | A1* | 9/2011 | McDougal et al. | 726/23 |
| 2011/0252415 | A1* | 10/2011 | Ricci | 717/173 |
| 2012/0017275 | A1* | 1/2012 | Harmonen | 726/24 |
| 2012/0084759 | A1* | 4/2012 | Candea et al. | 717/126 |

OTHER PUBLICATIONS

Bose et al., On capturing malware dynamics in mobile power-law networks, Sep. 2008, 10 pages, <http://delivery.acm.org/10.1145/1470000/1460893/a12-bose.pdf>.*

Karyotis et al., On the malware spreading over non-propagative wireless ad hoc networks: the attacker's perspective, Oct. 2007, 4 pages, <http://delivery.acm.org/10.1145/1300000/1298268/p156-karyotis.pdf>.*

Kalafut et al., A study of malware in peer-to-peer networks, Oct. 2006, 6 pages, <http://delivery.acm.org/10.1145/1180000/1177124/p327-kalafut.pdf>.*

Ye et al., IMDS: intelligent malware detection system, Aug. 2007, 5 pages, <http://delivery.acm.org/10.1145/1290000/1281308/p1043-ye.pdf>.*

Solomon, Alan, "Viruses & Polymorphism", Proceedings of the International Virus Protection and Information Security Council, Mar. 31, 1994.

Case, Tori, "Viruses: An Executive Brief", Proceedings of the International Virus Protection and Information Security Council, Mar. 31, 1994.

"Automated Program Analysis for Computer Virus Detection", IBM TDB, vol. 34, No. 2, pp. 415-416, Jul. 1991.

"Artificial Immunity for Personal Computers", IBM TDB, vol. 34, No. 2, pp. 150-154, Jul. 1991.

* cited by examiner

METHOD, SYSTEM AND PROGRAM PRODUCT FOR OPTIMIZING EMULATION OF A SUSPECTED MALWARE

CROSS REFERENCE TO RELATED APPLICATION

This application is a continuation of U.S. Ser. No. 11/855,392, filed Sep. 14, 2007 which is now issued U.S. Pat. No. 8,176,477.

FIELD OF THE INVENTION

The present invention relates to computer systems and software, and more specifically to an automated technique for optimizing emulation of a suspected malware.

BACKGROUND OF THE INVENTION

In today's business environment, customers are increasingly conducting online or electronic transactions over the Internet with organizations and/or businesses, such as retailers, banking services, etc. Invariably, with increasing traffic over the Internet, identifying potential malware, such as viruses, worms, trojans, etc. before they infect a computer infrastructure or system used in a business operation is crucial. Accordingly, businesses and/or organizations spend considerable time and money observing potential malware in an isolated environment to ensure that all aspects of a computer infrastructure employed are operational and that identification of any potential malware is not missed. As such, there is a need for a business and/or organization to effectively monitor and/or identify potential malware in a computer infrastructure that is fast and accurate and cost-effective.

SUMMARY OF THE INVENTION

The present invention resides in a method, system and program product for optimizing emulation of a suspected malware. The method includes identifying, using a tool configured to optimize emulation, whether a current instruction in a suspected malware being emulated by an anti-malware emulation engine in a virtual environment signifies a long loop. The tool determines if a current instruction fetched and decoded in the suspected malware is a control transfer instruction for transferring control to another instruction and if the current instruction is determined to be a control transfer instruction, verifying whether the other instruction and the current instruction along with other instructions forms a loop. In an embodiment, the verifying step includes checking whether a pre-specified condition is met for identifying the loop as a long loop. In an embodiment, the pre-specified condition comprises at least one of the following: number of iterations in the loop, number of times the loop is executed or time it takes to execute the loop. If it is determined that a long loop exists, the tool generates a first output value for the long loop. Further, the tool ascertains by comparison whether the first output value generated matches a respective first output value corresponding to one or more established long loop entries stored in a storage. If the tool does not find the one or more established long loop entries having the respective first output value matching the first output value generated, then the anti-malware emulation engine executes the current instruction. However, if the tool finds one or more established long loop entries having the respective first output value matching the first output value generated for the long loop, then the tool calculates a second output value for the long loop and inspects the one or more established long loop entries ascertained to find by comparison an established long loop entry having a respective second output value matching the second output value calculated. If the entry matching the second output value calculated is found, then the tool updates one or more states of the anti-malware emulation engine emulating the suspected malware in the virtual environment, such that, execution of the long loop of the suspected malware is skipped in order to optimize emulation of the suspected malware in the virtual environment. In an embodiment, the first output value is a first hash value computed using a first hash function, where the first hash value is a 32-bit hash value. Further, in an embodiment, the second output value is a second hash value computed using a second hash function, the second hash value for the long loop being based on the contents of the long loop and based on the length of the long loop.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
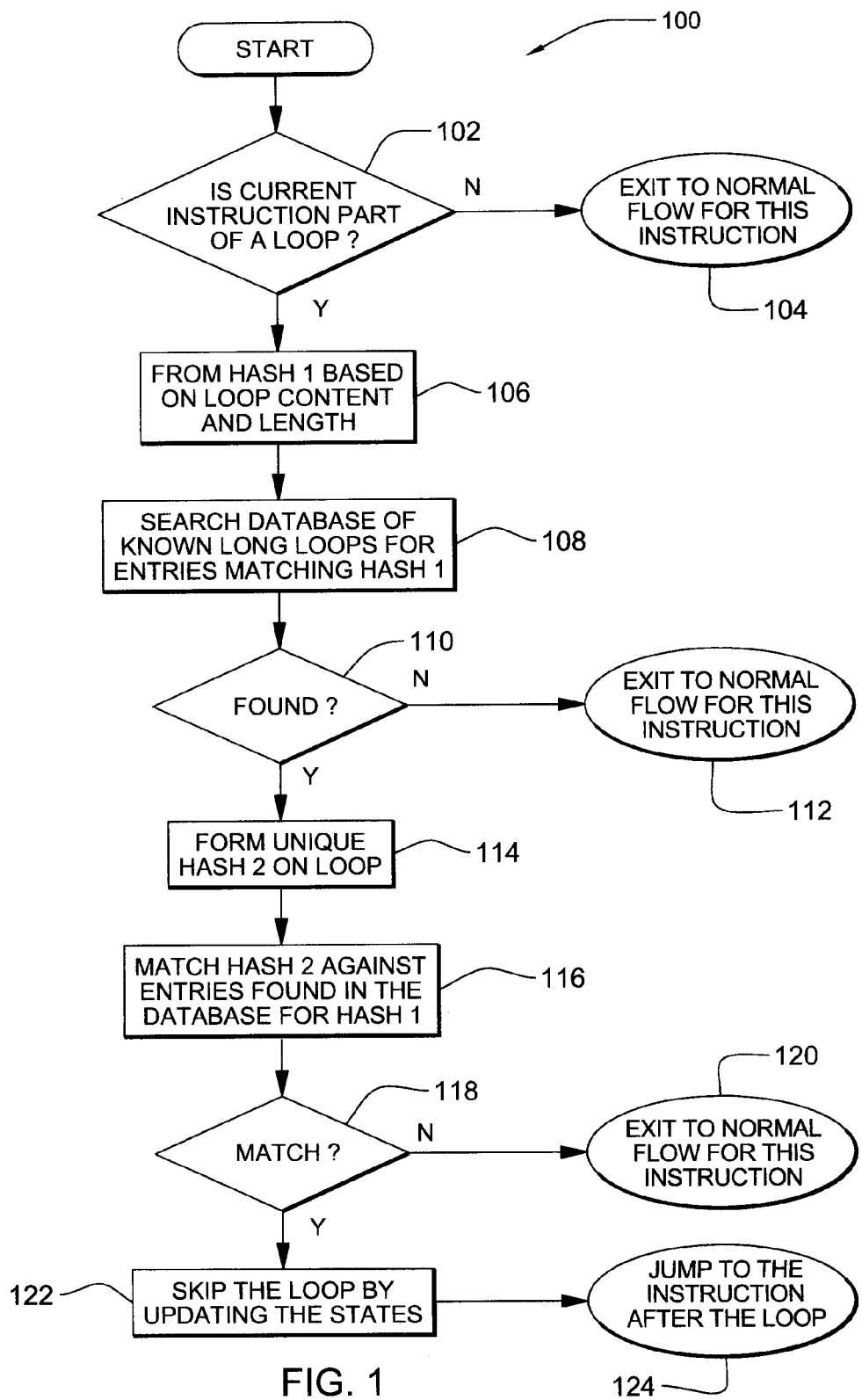
FIG. 1 depicts a flowchart outlining the steps performed by an emulation optimizer program tool or code for optimizing emulation of a suspected malware, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network. Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, as shown in FIG. 1, the invention provides a method 100 for optimizing emulation of a suspected malware in a virtual environment. In particular, the invention provides a method of identifying using a program tool or code configured to optimize emulation (referred to herein as an emulation optimizer program tool or code or emulation optimizer tool), whether a current instruction in a suspected malware or program being emulated in a virtual environment signifies a long loop. As used herein, the term "long loop" signifies a loop where millions or even billions of instructions are executed. The number of instructions contained in an iteration of the loop may be small, but the number of iterations or the number of times that the loop is executed is usually in the thousands or even in the millions. In an embodiment, the emulation optimizer tool runs on a host machine (in the host environment), which has residing in memory an AV (anti-virus) emulation engine that has a virtual machine (in the virtual environment) for emulating the suspected malware or program in the virtual environment. The anti-virus (AV) emulation engine utilizes the emulation optimizer tool for optimizing emulation of a suspected malware, as will be discussed herein below with respect to FIGS. 2 and 3. Turning to FIG. 1, in step 102, the emulation optimizer program tool or code checks whether or not the current instruction of the suspected malware is a control transfer instruction for transferring control to another instruction, such as, "jmp", "loop", "call", etc. If the emulation optimizer tool or code determines that the current instruction being emulated is a control transfer instruction, then the emulation optimizer tool further checks or verifies whether the current instruction is a control transfer instruction for transferring control to another instruction with which the current instruction forms a loop, along with other instructions. Further, the emulation optimizer tool determines if the loop is a long loop. In an embodiment, the emulation optimizer tool checks or tracks whether a pre-specified condition is met for identifying whether a loop is a long loop. In an embodiment, the pre-specified condition comprises at least one of the following: number of iterations in the loop, number of times the loop is executed or time it takes to execute the loop. Accordingly, if the pre-specified condition is number of iterations in the loop, then the emulation optimizer tool checks the iteration count, which tracks the number of iterations for a loop, against a pre-determined threshold number of iterations set for a loop. For instance, if the pre-determined threshold number of iterations is set to 100,000 iterations, then if the 100,000 iterations have been exceeded, then that loop is considered to be a long loop. Alternatively, if the pre-specified condition is number of times the loop has been executed, then the emulation optimizer tool checks to see the number of times that the loop has been executed. For instance, if the pre-determined threshold number of times a loop is executed is set to 100 times, then if the 100 times of execution has been exceeded, then that loop is considered to be a long loop. Similarly, if the pre-specified condition is amount of time it takes to execute a loop, then the emulation optimizer tool checks to see the time (in seconds) it takes for the loop to be executed. For instance, if the pre-determined threshold amount of time is set to 100 milliseconds, then if the 100 milliseconds time limit is exceeded, then that loop is considered to be a long loop. It is understood that a different pre-determined threshold number of iterations or a different pre-determined threshold number of times a block of code is executed or a different pre-determined threshold for time may be utilized by one skilled in the art. Further, other conditions may be pre-defined by one skilled in the art to determine whether or not a current instruction is part of a loop. Accordingly, if the emulation optimizer tool determines or identifies in step 102 that the current instruction is possibly part of a long loop, based on either iteration count or based on the number of times the block has been executed or based on the amount of time it takes to execute the loop, then the emulation optimizer tool, in step 106, forms or generates a first hash value for the long loop identified. However, back in step 102, if the emulation optimizer tool determines that the current instruction is not part of a loop, then the emulation optimizer tool exits in step 104 to the normal flow for the current instruction, that is, the anti-virus (AV) emulation engine executes the current instruction, as explained further herein below with respect to FIGS. 4 and 5. In step 106, the emulation optimizer tool generates the first hash value (also referred to as a first hash or hash1 or first output value) for the long loop based on contents of the long loop and based on the length computed for the long loop, the computed length of the loop being the number of bytes corresponding to the instructions contained in one iteration. In an embodiment, the first hash value is a 32-bit hash value, which is formed or generated, for instance, by using a first hash function. A hash function is a transformation that takes a variable-size input and returns a fixed-length value, which is referred to as a hash value or hash. In an embodiment, the first hash value is generated by using a few assembly instructions. The first hash value formed is not unique, which means two different loops may have the same first hash value. In an embodiment, the first hash value is calculated using the following hash function:

"length|(bytes[0]<<8)|(bytes[length>>2]<<16)|(bytes [length>>1]<<24)".

The variable "length" is the length of the loop content in the memory. The first byte of the loop is "bytes[0]". The "length>>2" is equal to "length/4", so bytes[length>>2] is the byte at ¼ length in the memory. Likewise, "length>>1" is equal to "length/2". The shift operation ">>" is used instead of division operation in order to speed up the calculation. The "|" operator is the "OR" operator in the C programming language. Thus, in an embodiment, the 32-bit first hash value is constructed by picking or selecting three bytes from the loop, that is, the second byte of the hash value is the first byte of the loop; the third byte of the hash value contains the byte located at ¼ length of the loop content in the memory; and the fourth byte of the hash value contains the byte located at ½ length of the loop content in the memory. The first hash value is then "OR-ed" with the length of the loop. The length could be more than 256, so the first byte of the variable "length" will be placed in the first byte of the 32-bit hash value, and the higher bytes of the variable "length" will be OR-ed with byte[0], etc. It is understood by one skilled in the art that the first hash value can be formed or generated using other formulas and/or techniques. For example, the third byte of the hash value could contain a byte located at ⅛ length, instead of ¼ length. Similarly, the placement of the three bytes from the loop content in the 32-bit hash value can be modified. The key to the first hash function is that the first hash value needs to be generated quite quickly and does not necessarily have to be unique. As mentioned earlier it can be typically carried out in a few assembly instructions after compilation. Further, in step 108, the emulation optimizer tool searches a database that contains or stores entries corresponding to well-known or established long loops that have been previously identified. In an embodiment, the entries in the database are indexed by their first hash values for searching the well-known long loops. Many entries in the database may have the same first hash value, since the method by which the first hash value is generated is not necessarily unique to any given loop. In particular, the emulation optimizer tool ascertains in step 108 whether the first hash value generated in step 106 matches a respective first hash value of any of the entries stored in the database. If the emulation optimizer tool finds in step 110 one or more entries that match the first hash value generated in step 106, then the emulation optimizer tool calculates or forms in step 114 a unique second hash value (also referred to as a second hash or hash2) for the long loop, utilizing a second hash function, which is also based on content and length of the loop. The second hash value calculated is a unique value, which is unique to only a single long loop. The unique second hash value can also be calculated or generated, for instance, by using assembly instructions, but in this case, many more assembly instructions are needed, thus, making it a lengthy process compared to the forming of the first hash value. In an embodiment, the second hash value can be calculated using a customized hash function that utilizes every single byte contained in the loop and not just a select few bytes as done for generating the first hash value. Alternatively, a widely used industry standard hash function, such as, MD5 (Message-Digest algorithm 5) may be used for calculating the second hash value. It is understood by one skilled in the art that the second hash value can be calculated using other known techniques and/or other available software tools in the market.

Accordingly, in step 114 of FIG. 1, the unique second hash value is only calculated in step 114 when an entry is found in step 110. Referring back to step 110, if the emulation optimizer tool does not find any entries that match the first hash value generated in step 106, then the emulation optimizer tool exits in step 112 to the normal flow for the current instruction, that is, the anti-virus (AV) emulation engine executes the current instruction, as explained further herein below with respect to FIGS. 4 and 5. Further, in step 116, the emulation optimizer tool ascertains whether the unique second hash value generated in step 114 matches a respective second hash value of any of the entries found in step 110 that have a respective first hash value corresponding to the first hash value formed in step 106. If the emulation optimizer tool does not find in step 118 an entry matching the unique second hash value calculated in step 114, then the emulation optimizer tool exits in step 120 to the normal flow for the current instruction, that is, the anti-virus (AV) emulation engine executes the current instruction, as explained further herein below with respect to FIGS. 4 and 5. However, if the emulation optimizer tool finds in step 118 an entry matching the unique second hash value calculated in step 114, then the emulation optimizer tool in step 122 updates the virtual states of the AV (anti-virus) emulation engine. In an embodiment, each record or entry in the database that corresponds to a long loop contains or sets forth a routine for updating the virtual states. If an entry is found matching the unique second hash value then the routine contained in that entry found is executed instead of the long loop being executed, such that, execution of the long loop is skipped and the emulation optimizer tool jumps to the next instruction after the long loop in step 124, thus, optimizing emulation of the suspected malware by the anti-virus (AV) or anti-malware emulation engine. Accordingly, the updating of the virtual states in step 122 has the effect that the suspected malware or program considers the updates of the virtual states to be the result of each instruction in the long loop being executed when in fact execution of the long loop was entirely skipped.

Figure 2:
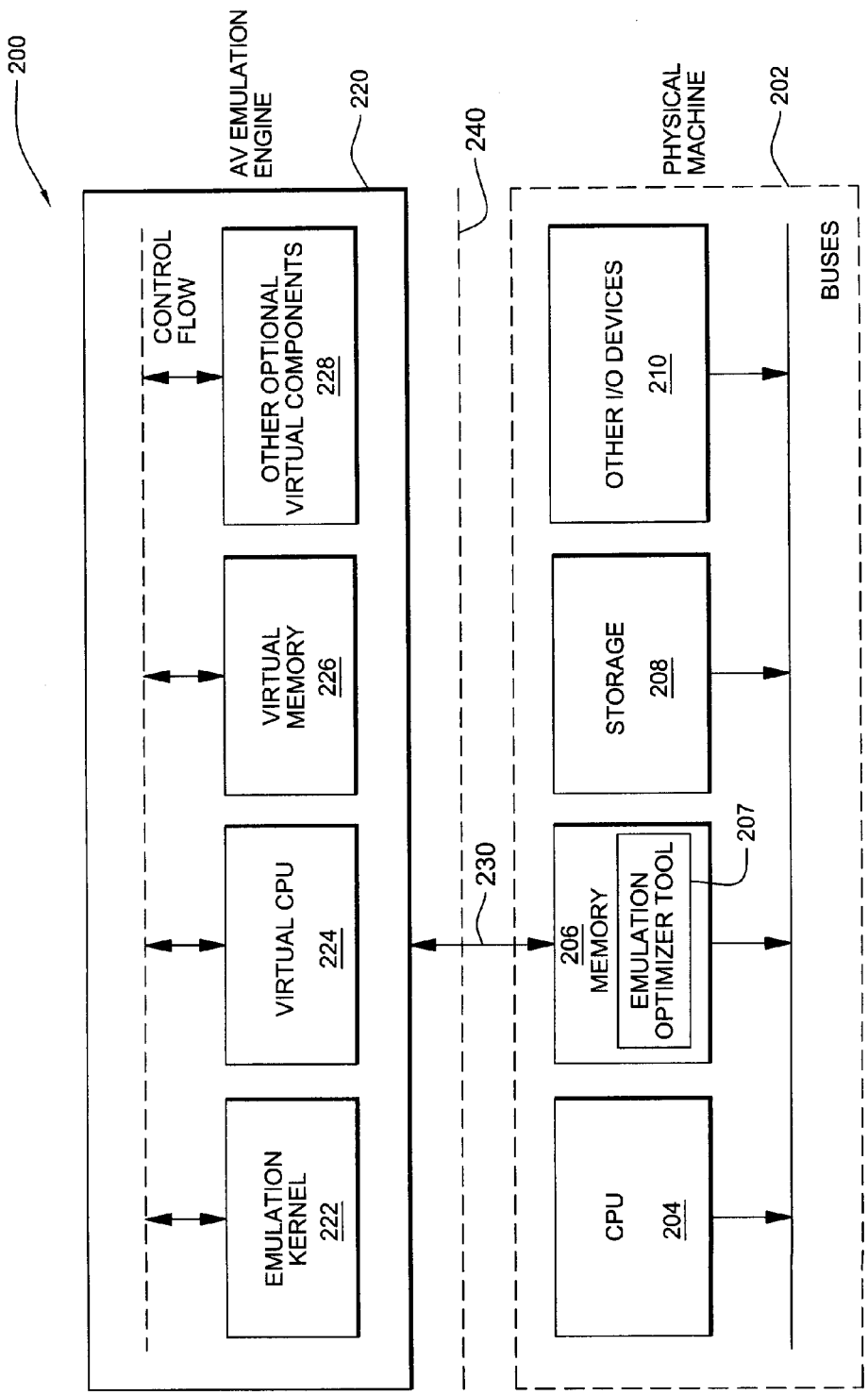
FIG. 2 is a schematic block system diagram illustrating an embodiment of a system having deployed thereon an emulation optimizer program tool or code for optimizing emulation of a suspected malware, in accordance with an embodiment of the present invention.

In another embodiment, the invention provides a system for optimizing emulation of a program in a virtual environment. Turning to FIG. 2, FIG. 2 is a schematic block system diagram illustrating one embodiment of an emulation system 200 comprising a computing or computer system 202 (the actual physical machine or host machine), such as, a standalone or personal computer or a server running an AV (anti-virus) emulation engine or an AV (anti-virus) emulation virtual machine 220 for carrying out emulation of a suspected malware in a virtual environment. The anti-virus emulation engine 220 further utilizes an emulation optimizer program tool or code 207 deployed on the host machine 202 for optimizing emulation of the program suspected of being malware, in accordance with an embodiment of the present invention. Although the invention is discussed herein below in terms of a server, it is understood that the invention can be practiced on a personal computer running an AV (anti-virus) emulation engine. As shown in FIG. 2, the host system or server 202 includes a CPU (central processing unit) 204, a memory device 206, a storage device 208, such as, a hard disk drive and includes other I/O devices 210, such as, a monitor, a keyboard, a network adapter or card, such as, a Network Interface Card (NIC), etc. Further, in an embodiment, the physical memory 206 of the host system 202 has deployed thereon an emulation optimizer program tool 207, which is configured to optimize emulation of a suspected malware carried out by the AV (anti-virus) emulation engine 220. In particular, as shown in FIG. 2, the AV (anti-virus) emulation engine 220 resides (as shown by the double-sided arrow 230)

on the memory 206 of the physical machine or host computer system 202, but the emulation of a suspected malware is carried out by the AV (anti-virus) emulation engine 220 in a virtual environment (referenced by the dotted line 240), as explained further herein below with respect to FIGS. 4 and 5. In an embodiment, the AV (anti-virus) emulation engine 220 comprises an emulation kernel 222, a virtual CPU 224 and a virtual memory 226. Further, in an embodiment, the AV emulation engine 220 may include other optional virtual components 228, such as, a virtual operating system (OS). In an embodiment, the emulation kernel 222 is configured to control various other virtual components of the AV (anti-virus) emulation engine 220. Further, the emulation kernel 222 is configured to interact or communicate with external systems, such as, a signature scanning engine and/or a behavioral analysis module, etc.

Figure 3:
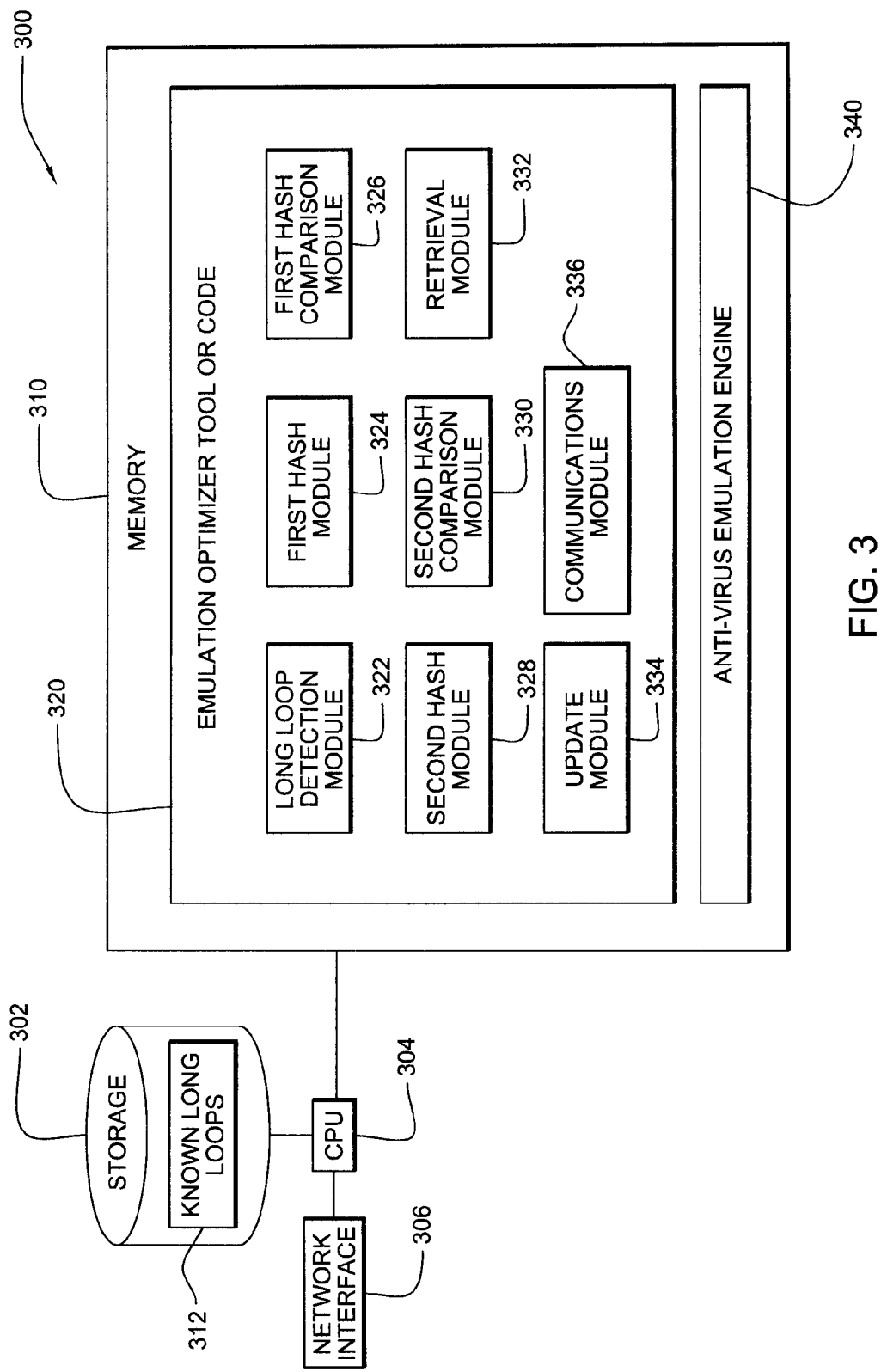
FIG. 3 is a schematic block system diagram of an emulation system having an emulation optimizer program tool or code for optimizing emulation of a suspected malware, in accordance with an embodiment of the present invention.

Reference is now made to FIG. 3, which depicts one embodiment of an emulation system 300, such as, a computer workstation or a computer server that is configured to optimize emulation of a piece of malware in a virtual environment. In an embodiment, the system 300 has installed and running thereon (shown in local memory 310) an AV (anti-virus) emulation engine 340, that is configured to emulate a program or a piece of software suspected of being a malware or malicious or harmful in nature. In an embodiment, the AV (anti-virus) emulation engine 340 comprises the Virus Prevention System, which is commercially available from International Business Machines Corporation (IBM). It is understood that any other commercially available anti-virus or malware emulation engines may be used to practice this invention. The server or system 300 comprises a central processing unit (CPU) 304, a local storage device 302, a network interface 306, and a memory 310. The CPU 304 is configured generally to execute operations within the system/server 300, such as, the emulation optimizer program tool or code 320 that is utilized by the AV (anti-virus) emulation engine 340. The network interface 306 is configured, in one embodiment, to facilitate network communications of the system 300 over a communications channel of a network. In one embodiment, as shown in FIG. 3, the emulation optimizer program tool or code 320 which, in an embodiment, runs on the emulation server or system 300, comprises a logic unit that contains a plurality of modules configured to functionally execute the necessary steps of optimizing emulation of a program or suspected malware in a virtual environment. In particular, the emulation optimizer program tool or code 320 comprises a long loop detection module 322, a first hash module 324, a first hash comparison module 326, a second hash module 328, a second hash comparison module 330, a retrieval module 332, update module 334 and a communications module 336.

Referring to FIG. 3, the long loop detection module 322 is configured to identify whether or not a current instruction in a program or suspected malware being emulated by the AV (anti-virus) emulation engine 340 in the virtual environment signifies a long loop. In an embodiment, the long loop detection module 322 is configured to determine whether or not a current instruction fetched and decoded by the anti-virus emulation engine 340 is part of a long loop, that is, whether the current instruction is a control transfer instruction for transferring control to another instruction in the suspected malware with which the current instruction forms a loop, along with other instructions. In an embodiment, the long loop detection module 322 is configured to determine the possibility of a loop being a long loop through iteration count for the loop or based on the number of times the loop has been executed or based on the amount of time it takes to execute the loop. The first hash module 324 is configured to generate or form a first hash value based on contents and based on length computed for the long loop that is determined by the long loop detection module 322. Further, the first hash comparison module 326 is configured to search a storage device, for instance, storage 302, for any known or established long loops 312 that have been previously identified. As such, the first hash comparison module 326 of the emulation optimizer program tool 320 is configured to search the storage 302 for any entries corresponding to any known or established long loops 312 having a respective first hash value corresponding to the first hash value generated by the emulation optimizer program tool 320 for the suspected malware being emulated. The second hash module 328 is configured to generate or form a unique second hash value, which is unique to the current loop being analyzed by the emulation optimizer program tool or code 320. Further, the second hash comparison module 330 is configured to search the known or established long loops identified or retrieved by the first hash comparison module 326 that have a respective first hash value corresponding to the first hash value generated by the first hash value module 324 to determine whether any of those entries found match or have a unique second hash value corresponding to the unique second hash value generated for the current loop by the second hash module 328. In an embodiment, the retrieval module 332 is configured to retrieve any known long loops among the known long loop entries 312 stored in storage 302 that correspond to a current first hash value generated for a long loop being analyzed or examined by the emulation optimizer program tool or code 320 and to retrieve any entries among those entries retrieved that correspond to a current second hash value calculated for the current loop being analyzed or examined by the emulation optimizer program tool or code 320. Furthermore, the update module 334 is configured to update the virtual states of the AV (anti-virus) emulation engine 340. In an embodiment, the update module 334 is configured to execute the routine set forth in the record or entry corresponding to a long loop found in the database 302 that matches the unique second hash value calculated in order to update the virtual states of the anti-virus emulation engine 340, such that, execution of the long loop is skipped and the emulation optimizer tool jumps to the next instruction after the long loop in the suspected malware, thus, optimizing emulation of the suspected malware. In addition, the communications module 336 is configured to permit communication between the various modules of the emulation optimizer program tool or code 320 and with the anti-virus (AV) emulation engine 340 and other systems, such as, the storage 302.

Figure 4:
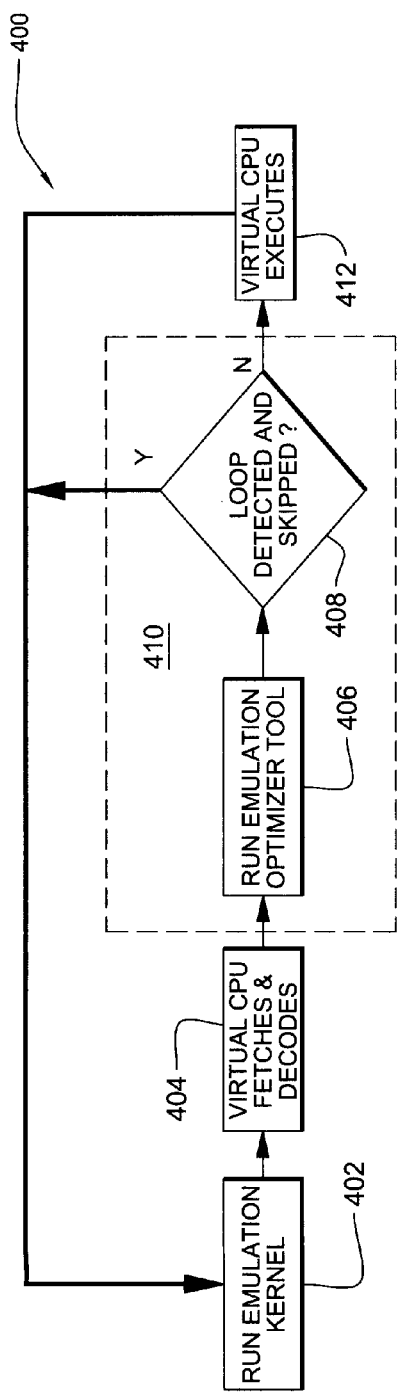
FIG. 4 depicts a flowchart outlining the operational steps performed by an emulation optimizer program tool or code when used in one type of an AV (anti-virus) emulation engine for optimizing emulation of a suspected malware, in accordance with an embodiment of the present invention.
Figure 5:
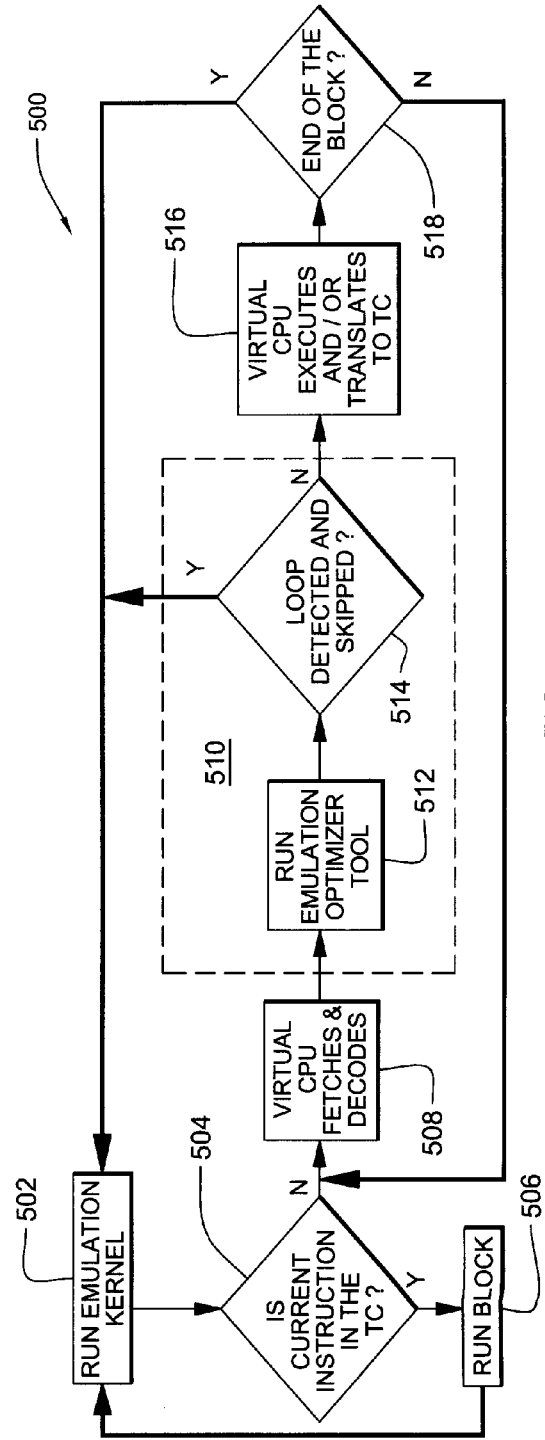
FIG. 5 depicts a flowchart outlining the operational steps performed by an emulation optimizer program tool or code when used in another type of an AV (anti-virus) emulation engine for optimizing emulation of a suspected malware, in accordance with an embodiment of the present invention.

Reference is now made to FIGS. 4 and 5, which outline the operational steps performed by an emulation optimizer program tool or code when used in two separate types of an AV (anti-virus) emulation engine used for optimizing emulation of a suspected malware, in accordance with an embodiment of the present invention. Turning to FIG. 4, reference numeral 400 outlines the operational steps performed by an emulation optimizer tool when used in one type of an AV (anti-virus) emulation engine, namely, an interpreter engine. An emulation system utilizing an emulation optimizer tool with an interpreter engine (referenced by reference numeral 400) typically performs a fetch, decode and execute operation for every instruction to be emulated. As shown in FIG. 4, the interpreter engine comprises an emulation kernel (as shown in FIG. 2) which is run in step 402 to determine whether or not to fetch the next instruction in the suspected malware that is to be emulated or whether to stop emulation, for example, due to a timeout, etc. If the emulation kernel determines that the emulation is to continue, the emulation kernel instructs the virtual CPU to fetch and decode in step 404 the next instruction of the suspected malware. As such, the emulation system 400 running the interpreter engine in a virtual environment utilizes or runs the emulation optimizer tool (in a host environment 410) after an instruction in the suspected malware has been fetched and decoded (in step 404) by the virtual CPU of the interpreter engine. In particular, the emulation system runs the emulation optimizer tool in step 406 on a host machine (shown by the dotted rectangle 410 and discussed herein above with respect to FIG. 3), separate from the virtual environment in which the interpreter engine carries out emulation of the suspected malware. The emulation optimizer tool running on the host machine (part of the host environment 410) performs in step 408 the steps of detecting whether or not a current instruction is part of a long loop and, if so, skipping execution of the long loop detected, as outlined herein above with respect to FIG. 1. In particular, if a long loop is detected in step 408, the emulation optimizer tool updates the states of the interpreter engine having an effect as if the long loop has been executed. As such, the interpreter engine skips execution of the long loop that is detected and the control flow goes back to the emulation kernel, which is run in step 402 to instruct the virtual CPU to fetch the next instruction of the suspected malware being emulated. On the other hand, if the emulation optimizer tool does not detect a long loop in step 408, then the virtual CPU of the interpreter engine proceeds to execute in step 412 the current instruction that has been decoded in step 404. Upon execution of the current instruction in step 412, the control flow goes back to the emulation kernel of the interpreter engine, which is run in step 402 to instruct the virtual CPU to fetch the next instruction of the suspected malware being emulated.

Turning to FIG. 5, reference numeral 500 outlines the operational steps performed by an emulation optimizer tool when used in another type of an AV (anti-virus) emulation engine, namely, a binary translation engine. A binary translation engine translates the instructions of a suspected malware into native instructions first and stores the instructions in a translation cache (TC). As such, the binary translation engine manages the emulated instructions in blocks, so the binary translation engine only needs to check at a block boundary whether or not an emulated instruction is already stored in the translation cache (TC), which in an embodiment, is stored in the memory of the host or physical machine. A "block" refers to a sequence of non-control transfer instructions, followed by a control transfer instruction. If the current instruction is part of a block that has been translated, then the binary translation engine runs the translated instructions in the block instead. Referring to FIG. 5, the emulation kernel of the binary translation engine is run in step 502. The emulation kernel of the binary translation engine determines whether or not to stop emulation, for example, due to a timeout, etc. If the emulation kernel of the binary translation engine determines to continue emulation, then the emulation kernel of the binary translation engine determines in step 504 whether or not a current instruction being analyzed for emulation is stored in the translation cache (TC), located in the physical memory. If the emulation kernel of the binary translation engine determines in step 504 that a current instruction to be emulated is already stored in the translation cache (TC), then the emulation kernel of the binary translation engine runs in step 506 the translated block, which contains the translated instructions for every instruction in the block. After the emulation kernel runs the translated block in step 506, the emulation kernel returns to step 502 to determine again whether or not to continue emulation. However, going back to step 504, if the current instruction to be emulated is not stored or found in the translation cache (TC), then the emulation kernel instructs the virtual CPU of the binary translation engine to fetch and decode in step 508 the current instruction to be emulated. In particular, the emulation system 500 running the binary translation engine in a virtual environment utilizes or runs in step 512 the emulation optimizer tool (in a host environment 510), that is, after an instruction in the suspected malware has been fetched and decoded (in step 508) by the virtual CPU of the binary translation engine. In particular, the emulation system runs the emulation optimizer tool in step 512 on a host machine (shown by the dotted rectangle 510 and discussed herein above with respect to FIG. 3), separate from the virtual environment in which the binary translation engine carries out emulation of the suspected malware. The emulation optimizer tool running on the host machine (part of the host environment 510) performs in step 514 the steps of detecting whether or not a current instruction is part of a long loop and, if so, skipping execution of the long loop detected, as outlined herein above with respect to FIG. 1. In particular, if a long loop is detected in step 514, the emulation optimizer tool updates the states of the binary translation engine having an effect as if the long loop has been executed. As such, the binary translation engine skips execution of the long loop that is detected and the control flow goes back to the emulation kernel, which is run in step 502 to determine whether to stop emulation, for instance, due to a timeout, etc. or to continue with step 504. On the other hand, if the emulation optimizer tool does not detect a long loop in step 514, then the emulation kernel of the binary translation engine instructs the virtual CPU to execute and/or translate into native instructions in step 516 the current instruction that has been decoded in step 508. In an embodiment, the instruction may be both executed and translated in step 516 or only executed (for instance, if the anti-virus emulation engine is configured to translate only if the instruction has been executed X number of times) or, further, the instruction may only be translated in step 516. If the instruction is translated in step 516, the translated instructions are stored in the translation cache (TC). Upon execution and/or translation of the current instruction in step 516, the system 500 determines in step 518 if the binary translation engine has reached the end of a block. If the system 500 determines in step 518 that the binary translation engine has reached the end of a block, then the control flow goes back to the emulation kernel of the binary translation engine, which is run in step 502 to determine whether or not to stop emulation, for instance, due to a timeout, etc. However, if the system 500 determines in step 518 that the binary translation engine has not reached the end of a block, then the process continues at step 508 with the virtual CPU of the binary translation engine fetching and decoding in step 508 the next instruction of the suspected malware. Given that a binary translation engine can perform up to ten times faster than an interpreter engine, the emulation optimizer tool performing the loop detection and skipping steps can further optimize emulation of a suspected malware in a system utilizing a binary translation engine.

Figure 6:
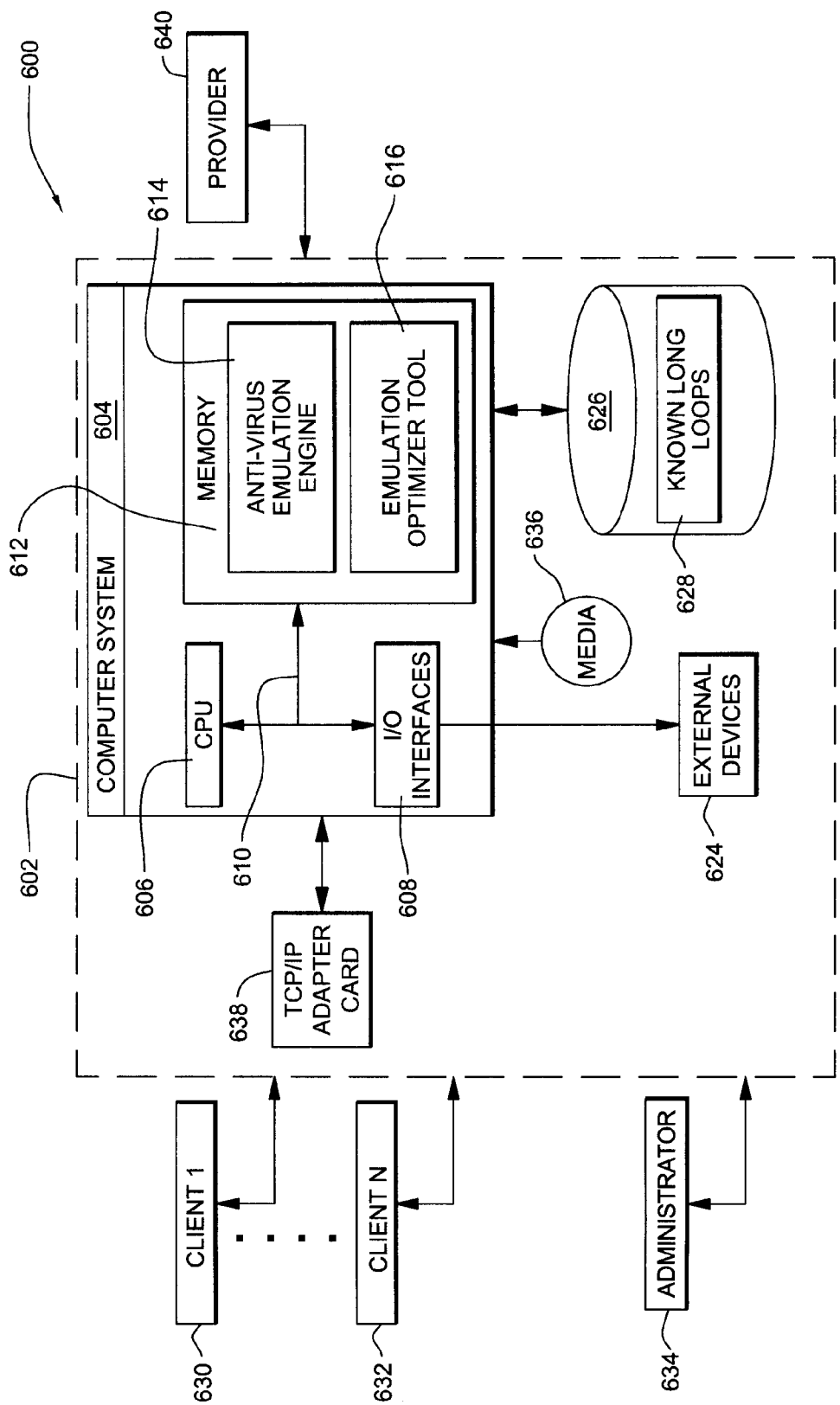
FIG. 6 illustrates a host system 600 that provides a computer program product for optimizing emulation of a suspected malware.

Referring now to FIG. 6, there is illustrated a host system 600 that provides a computer program product for optimizing emulation of a suspected malware, in accordance with an embodiment of the present invention. The computer program product comprises a computer readable or computer-usable medium, which provides program code, namely, the emulation optimizer program tool 616, for use by or in connection with an AV (anti-virus) emulation engine or program instructions 614 residing on memory 612 of system 604. In an embodiment, the AV (anti-virus) emulation engine 614, although residing on memory 612 of the host or emulation system 600 has a virtual environment with a virtual CPU (as shown by reference numeral 224 of FIG. 2), separate from the host environment. The emulation optimizer program tool or program 616 can be loaded into the host system 604 from a computer readable media 636, such as, a magnetic tape or disk, optical media, DVD, memory stick, semiconductor memory, etc. or downloaded from the Internet via a network adapter or card, such as, a TCP/IP adapter card 638. As depicted in FIG. 6, system 600 includes a computer infrastructure 602, namely, a malware emulation infrastructure 602, which is intended to represent any type of computer architecture that is maintained in a secure environment (i.e., for which access control is enforced). As shown, infrastructure 602 includes a computer system 604, which in an embodiment, represents a server 604, in particular, an emulation server or the like that includes an emulation engine or program, namely, the anti-virus (AV) emulation engine 614 configured to emulate a program suspected of being a malware. In addition, the system 604 includes the emulation optimizer program tool 616, running on the host system 604, which is utilized by the AV (anti-virus) emulation engine 614 for optimizing emulation of the program suspected of being a malware. It should be understood, however, that although not shown, other hardware and software components (e.g., additional computer systems, routers, firewalls, etc.) could be included in infrastructure 602.

In general, users at client 1 (reference numeral 630) through client N (reference numeral 632) can access the computer infrastructure 602 for running the emulation optimizer program tool or code 616 for optimizing detection of malware that is analyzed by the AV (anti-virus) emulation engine 614. As mentioned herein above, the AV (anti-virus) emulation engine 614 utilizes the emulation optimizer program tool or code 616 for detecting long loops and for skipping execution of the long loops in the emulation process, which optimizes emulation of the suspected malware, as explained herein above with respect to FIGS. 2 through 5. As shown in FIG. 6, the emulation system 604 within infrastructure 602 is configured to communicate with various other systems and/or servers, for instance, an administrator server or computer 634 that is used by an administrator of the infrastructure 602. In any event, communication with infrastructure 602 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 602. It should be understood that under the present invention, infrastructure 602 could be owned and/or operated by a third party, such as, a service provider 640, or by an independent entity. Regardless, use of infrastructure 602 and the teachings described herein could be offered to the parties (clients 1 through N) on a subscription or fee-basis. In either scenario, an administrator, for instance, at an administrator server 634 could support and configure infrastructure 602, for supporting and/or configuring the infrastructure 602, such as, upgrading the emulation optimizer program tool 616 deployed on the emulation system 604.

The emulation system 604 (for instance, a server) is shown to comprise a CPU (hereinafter "processing unit 606"), a memory 612, a bus 610, and input/output (I/O) interfaces 608. Further, the system 604 is shown in communication with external I/O devices/resources 624. In general, processing unit 606 executes computer program code, such as, the emulation optimizer program tool or code 616. While executing the emulation optimizer computer program code 616, the processing unit 606 can read and/or write data, to/from memory 612, storage system 626, and/or I/O interfaces 608. For instance, in one embodiment, the emulation optimizer program tool 616 retrieves any known long loops 628 that have been previously analyzed and stored in storage 626. Alternatively, the known long loops may be stored in a separate storage external to the infrastructure 602. Bus 610 provides a communication link between each of the components in computer system 600, such that, information can be communicated within the infrastructure 602. External devices 624 can include any devices (e.g., keyboard, pointing device, display, etc.) that enable a user to interact with computer system 600 and/or any devices (e.g., network card, modem, etc.) that enable system 604 to communicate with one or more other computing devices.

Computer infrastructure 602 is only illustrative of various types of computer infrastructures for implementing the invention. For example, in an embodiment shown, computer infrastructure 602 comprises two or more computing devices (e.g., a server cluster) that communicate over a network to perform the various process steps of the invention. Moreover, computer system 600 is only representative of various possible computer systems that can include numerous combinations of hardware. To this extent, in other embodiments, computer system 600 can include any specific purpose computing article of manufacture including hardware and/or computer program code for performing specific functions, any computing article of manufacture that includes a combination of specific purpose and general purpose hardware/software, or the like. In each case, the program code and hardware can be created using standard programming and engineering techniques, respectively. Moreover, processing unit 606 may comprise a single processing unit, or be distributed across one or more processing units in one or more locations, e.g., on a client and server. Similarly, memory 612 and/or storage system 626 can include any combination of various types of data storage and/or transmission media that reside at one or more physical locations. Further, I/O interfaces 608 can include any system for exchanging information with one or more external devices 624. Still further, it is understood that one or more additional components (e.g., system software, math co-processing unit, etc.) not shown in FIG. 6 can be included in computer system 600. However, if computer system 600 includes a handheld device or the like, it is understood that one or more external devices 624 (e.g., a display) could be contained within computer system 604, and not externally as shown.

Storage system 626 can be any type of system (e.g., a database) capable of providing storage for information, such as, the established or known long loops 628 under the present invention. To this extent, storage system 626 could include one or more storage devices, such as a magnetic disk drive or an optical disk drive. In another embodiment, storage system 626 includes data distributed across, for example, a local area network (LAN), wide area network (WAN) or a storage area network (SAN) (not shown). Although not shown, additional components, such as cache memory, communication systems, system software, etc., may be incorporated into computer system 600.

Accordingly, as described herein above, the emulation optimizer tool uses a two-level hashing to match the code sequence of a suspected malware to known long loops. The first level hash performed is very quick and eliminates unknown loops. After matching the first level hash to one or more known long loops, the tool performs the second level hash on the code sequence, which is slower, but provides an exact match, if one exists. Given that each known long loop has a specific routine for state updates, the updating of the states replaces the millions or billions of instructions in that long loop, thus, optimizing emulation of the suspected malware by the anti-malware or anti-virus (AV) emulation engine.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for optimizing emulation of a suspected malware program, the method comprising the steps of:
    a computer emulating the suspected malware program;
    the computer identifying a first instruction in the suspected malware program that initiates a loop, and in response, the computer determining a length of the loop based at least in part on a number of times that the loop will be repeated, and if the length exceeds a predetermined threshold, generating a first hash value based at least in part on a hash of instructions in the loop;
    the computer storing the first hash value and executing the loop the number of times;
    the computer identifying a second, subsequent instruction in the suspected malware program that initiates a loop, and in response, the computer determining a length of the loop initiated by the second instruction, based at least in part on a number of times that the loop initiated by the second instruction will be repeated, and if the length exceeds a predetermined threshold, generating a second hash value based at least in part on a hash of instructions within the loop initiated by the second instruction, and comparing the second hash value to the first hash value, and
    if the second hash value matches the first hash value, the computer bypassing the loop initiated by the second instruction, and
    if the second hash value does not match the first hash value, the computer executing the loop initiated the second instruction the number of times that the loop initiated by the second instruction is repeated.

2. The method of claim 1, wherein the first instruction is a control transfer instruction for transferring control to the loop initiated by the first instruction, and the second instruction is a control transfer instruction for transferring control to the loop initiated by the second instruction.

3. A computer program product for optimizing emulation of a suspected malware program, the computer program product comprising:
    one or more computer-readable non-transitory storage devices and program instructions stored on at least one of the one or more storage devices, the program instructions comprising:
    program instructions to emulate the suspected malware program;
    program instructions to identify a first instruction in the suspected malware program that initiates a loop, and in response, determine a length of the loop based at least in part on a number of times that the loop will be repeated, and if the length exceeds a predetermined threshold, generate a first hash value based at least in part on a hash of instructions in the loop;
    program instructions to store the first hash value and execute the loop the number of times;
    program instructions to identify a second, subsequent instruction in the suspected malware program that initiates a loop, and in response, determine a length of the loop initiated by the second instruction, based at least in part on a number of times that the loop initiated by the second instruction will be repeated, and if the length exceeds a predetermined threshold, generate a second hash value based at least in part on a hash of instructions within the loop initiated by the second instruction, and compare the second hash value to the first hash value; and
    program instructions, responsive to the second hash value matching the first hash value, to bypass the loop initiated by the second instruction; and
    program instructions, responsive to the second hash value not matching the first hash value, to execute the loop initiated by the second instruction the number of times that the loop initiated by the second instruction is repeated.

4. The computer program product of claim 3, wherein the first instruction is a control transfer instruction for transferring control to the loop initiated by the first instruction, and the second instruction is a control transfer instruction for transferring control to the loop initiated by the second instruction.

5. A computer program product for optimizing emulation of a suspected malware program, the computer program product comprising:
    one or more computer-readable non-transitory storage devices and program instructions stored on at least one of the one or more storage devices, the program instructions comprising:
    program instructions to emulate the suspected malware program;
    program instructions to identify a first instruction in the suspected malware program that initiates a loop, and in response, determine a duration of the loop based at least in part on a number of times that the loop will be repeated, and if the duration exceeds a predetermined threshold, generate a first hash value based at least in part on a hash of instructions in the loop;
    program instructions to store the first hash value and execute the loop the number of times;
    program instructions to identify a second, subsequent instruction in the suspected malware program that initiates a loop, and in response, determine a duration of the loop initiated by the second instruction, based at least in part on a number of times that the loop initiated by the second instruction will be repeated, and if the duration of the loop initiated by the second instruction exceeds a predetermined threshold, generate a second hash value based at least in part on a hash of instructions within the loop initiated by the second instruction, and compare the second hash value to the first hash value; and
    program instructions, responsive to the second hash value matching the first hash value, to bypass the loop initiated by the second instruction; and
    program instructions, responsive to the second hash value not matching the first hash value, to execute the loop initiated by the second instruction the number of times that the loop initiated by the second instruction is repeated.

6. The computer program product of claim 5, wherein the first instruction is a control transfer instruction for transferring control to the loop initiated by the first instruction, and the second instruction is a control transfer instruction for transferring control to the loop initiated by the second instruction.

* * * * *